United States Patent

[11] 3,615,198

[72] Inventors Jack D. Terrana
Tampa;
Leo A. Miller, Lakeland, both of Fla.
[21] Appl. No. 847,754
[22] Filed May 15, 1969
[45] Patented Oct. 26, 1971
[73] Assignee Wellman-Lord, Inc.
Lakeland, Fla.
Continuation-in-part of application Ser. No. 616,682, Feb. 16, 1967, now abandoned, which is a continuation-in-part of application Ser. No. 594,431, Nov. 15, 1966, now abandoned.

[54] PROCESS EMPLOYING POTASSIUM SULFITE FOR RECOVERING SULFUR DIOXIDE FROM GASES CONTAINING SAME
17 Claims, 4 Drawing Figs.
[52] U.S. Cl. .................................................. 23/178, 23/2
[51] Int. Cl. ........................................ C01b 17/56, C01b 17/48
[50] Field of Search .......................... 23/177, 178, 2

[56] References Cited
UNITED STATES PATENTS
| | | | |
|---|---|---|---|
| 2,161,056 | 6/1939 | Johnstone et al. ............ | 23/178 |
| 3,369,866 | 2/1968 | Spormann et al. ............ | 23/114 |

FOREIGN PATENTS
| | | |
|---|---|---|
| 5,882 | 1885 | England |
| 382,983 | 1922 | Germany |

OTHER REFERENCES
Chem. Abs., Vol. 58, 11995e

*Primary Examiner*—Oscar R. Vertiz
*Assistant Examiner*—Charles B. Rodman
*Attorneys*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

ABSTRACT: Sulfur dioxide is recovered from waste gases by contacting the gas with aqueous potassium sulfite to produce potassium bisulfite and subsequently separating the bisulfite and $SO_2$-partial pressure lowering materials to obtain purer potassium bisulfite or potassium pyrosulfite which can be decomposed to release sulfur dioxide.

PROCESS EMPLOYING POTASSIUM SULFITE FOR RECOVERING SULFUR DIOXIDE FROM GASES CONTAINING SAME

This invention relates to the recovery of sulfur dioxide from sulfur dioxide containing gases. This application is a continuation-in-part of application Ser. No. 616,682, filed on Feb. 16, 1967 which in turn is a continuation-in-part of application Ser. No. 594,431, filed on Nov. 15, 1966. Both of these applications are now abandoned.

According to one existing practice, sulfur dioxide can be recovered from gases containing large concentrations thereof, e.g. 5 to 20 wt. percent sulfur dioxide, by cooling and scrubbing the gas with water which dissolves the sulfur dioxide and then heating the resulting solution to drive off the sulfur dioxide. Gases containing such amounts of sulfur dioxide can be produced, for example, by burning sulfur or sulfur-bearing ores with air. This process, however, requires large quantities of water and fuel and is correspondingly expensive since the solubility of sulfur dioxide in water is not very high and depends upon the percentage of sulfur dioxide in the gases and the temperature of the water used for absorption. Accordingly, this process is generally unsuitable for use with gases containing small concentrations of sulfur dioxide.

Sulfur dioxide is, however, found in significant amounts as a constituent of many waste gases such as smelter gases, off-gases from many chemical plants, and stack or furnace gases from coal-burning furnaces such as used in electric power plants, although its concentration in such gases is from about 0.001 to less than about 5 mole percent and frequently is less than about 0.5 mole percent (about 1 percent by weight). For example, a modern electric power plant of 1,350,000 kw. capacity will burn about 15,000 tons of coal per day. Much coal contains about 3.5 wt. percent sulfur, or even more. The emission of sulfur dioxide from a plant of this size using such coal would then amount to about 1,000 tons per day, although the concentration of sulfur dioxide in the stack gases can be very low, for instance on the order of 0.2 to 0.3 mole percent, depending upon the sulfur content of the coal.

This invention provides for the recovery of sulfur dioxide present in such small concentrations as well as in large concentrations in gases and thus provides for significant abatement of sulfur dioxide-air pollution although it is not limited thereto. Significant amounts, for instance greater than about 75 wt. percent, of sulfur dioxide can be removed from such gases.

In accordance with this invention, sulfur dioxide in the waste gas is reacted with potassium sulfite in aqueous solution to form an aqueous solution of potassium bisulfite and substantially reduce the sulfur dioxide content of the gas, for instance to less than about 0.2 mole percent in a stack gas containing more than about 0.2 mole percent. The potassium bisulfite is separated, e.g. crystallized, and can be recovered in crystalline form as potassium pyrosulfite which is subsequently decomposed to produce potassium sulfite and sulfur dioxide. Potassium bisulfite is transformed to potassium pyrosulfite during crystallization. The sulfur dioxide is drawn off and can be either cooled and compressed to provide a liquid product or sent as a gas to a sulfuric acid plant. The potassium sulfite can be recycled to the reaction zone wherein additional sulfur dioxide is absorbed. The reactions utilized in this invention include:

I. $K_2SO_3 + SO_2 + H_2O \rightarrow 2KHSO_3$

II. $2KHSO_3 \xrightarrow{cool} K_2S_2O_5C + H_2O$

III. $K_2S_2O_5 \xrightarrow{heat} K_2SO_3 + SO_2(g)$

For Reaction I to proceed, the temperature should be maintained at a temperature at which sulfur dioxide is absorbed by reaction with the aqueous solution of potassium sulfite, and below the temperature at which potassium bisulfite decomposes or Reaction III proceeds, e.g. below about 230° F. In general, the cooler the solution of potassium sulfite, the more readily sulfur dioxide will be absorbed by the solution and react with potassium sulfite. With stack or furnace gases, however, the temperature of the solution will generally be above about 90° or 100° F. to avoid the need for refrigeration, although ambient temperatures are suitable. Preferably, the temperature is maintained below about 190° F., e.g. at about 120° to 180° or 185° F., since above these temperature ranges Reaction I begins to slow to a point where sulfur dioxide will not be readily absorbed into solution because the partial pressure of the sulfur dioxide becomes too high.

The solution resulting from a reaction of an aqueous solution of potassium sulfite and a stack gas inherently contains many ingredients, for instance the following is an example:

|  | Weight percent range | |
|---|---|---|
|  | Generally | Usually |
| Potassium sulfate | 0 to 8 | 1 to 6 |
| Potassium bisulfite | 5 to 40 | 10 to 30 |
| Potassium sulfite | 10 to 40 | 20 to 45 |
| Water | balance | balance |

The sulfur dioxide is present in chemically combined form, for instance as potassium bisulfite, which can be considered a sulfur dioxide precursor in the solution and is present or in contact with $SO_2$-partial pressure lowering materials for instance, metal salts, e.g. alkali metal salts, generally the potassium salts such as unreacted potassium sulfite and potassium sulfate, produced by reaction between sulfur trioxide and potassium sulfite. The purity of the potassium bisulfite in contact with the $SO_2$-partial pressure lowering materials is generally less than about 60 wt. percent on a dry basis.

In accordance with an advantageous feature of the present invention sufficient amounts of the $SO_2$-partial pressure lowering materials are separated from the potassium bisulfite to increase the partial pressure of the sulfur dioxide in the potassium bisulfite. The separation of the $SO_2$-partial pressure lowering materials can be effected by any suitable procedure, for instance by selectively extracting the potassium bisulfite from the solution or by extracting any one of the $SO_2$-partial pressure lowering materials from the solution. The separation can also be effected by chemically reacting the potassium bisulfite out of the solution, for instance by using an organic carbonyl compound, e.g. acetone, in accordance with a process described in the commonly owned copending application of Leo A. Miller et al., Ser. No. 786,755, filed Dec. 24, 1968, herein incorporated by reference, wherein the acetone is used to complex with the bisulfite, the complex is recovered, is heated to decompose the complex and provide the pyrosulfite form.

The separation is preferably conducted by crystallizing the potassium bisulfite (which transforms to potassium pyrosulfite during crystallization) out of the solution for further treatment in accordance with the invention as set forth below.

The release of sulfur dioxide from a precursor such as potassium pyrosulfite depends upon its partial pressure under given conditions, e.g. when in association with or without other materials including salts such as potassium sulfate and potassium sulfite which are generally present in the resulting solution produced by reaction of the sulfur dioxide containing stack gas with the aqueous solution of potassium sulfite. The partial pressure of sulfur dioxide in its precursor in the presence of other materials, e.g. potassium salts, in the reaction product solution at its boiling point at standard pressure conditions is so low, for instance for the typical solution described in an example below it is about 1.5 mm. of Hg, that it cannot be released in a feasible manner. In sharp contrast to this, its partial pressure when damp potassium pyrosulfite is in relatively pure form, for instance a purity greater than about 98 wt. percent on a dry basis, is relatively high, for instance about 300 mm. of Hg. The purity of the potassium pyrosulfite is increased in accordance with the present invention to generally greater than about 65 wt. percent, preferably greater than about 90 to 95 wt. percent. The following table sets forth the partial pressure of the sulfur dioxide in potassium pyrosulfite for the indicated purity.

TABLE

| Purity of $K_2S_2O_5$ Wt. percent (dry basis) | Partial Pressure of $SO_2$ mm. of Hg |
|---|---|
| 65 | 5.0 |
| 70 | 6.1 |
| 75 | 8.5 |
| 80 | 13.3 |
| 85 | 21.0 |
| 90 | 33.5 |
| 95 | 75.0 |
| 98 | 300.0 |

The potassium bisulfite can be advantageously separated or recovered in the form of potassium pyrosulfite by crystallization from the $SO_2$-partial pressure lowering materials in the solution. Crystallization of potassium pyrosulfite can be accomplished using suitable crystallization procedures, for instance by supersaturating the solution by heating it in a vacuum or advantageously by cooling the aqueous potassium bisulfite solution to a temperature at which a substantial portion of the pyrosulfite crystallizes, e.g. below about 150° F. generally, and it can range down to below about 100° F. or 110° F., with the lower limit being dictated by economics. For example, when a saturated solution of potassium bisulfite at 149° F. is cooled to 104° F., approximately 40 percent of the pyrosulfite crystallizes whereas when the solution is cooled to 77° F., approximately 70 percent of the pyrosulfite crystallizes. Since potassium sulfite is more soluble than potassium bisulfite, substantially pure, e.g. greater than about 95 wt. percent, pyrosulfite crystals can be obtained.

The potassium pyrosulfite crystals can be separated, e.g. by separation techniques such as centrifugation or filtration and heated to the decomposition temperature therefor; and, under ambient pressure conditions, these temperatures are generally greater than about 100° F. and sufficient to decompose the potassium pyrosulfite, for instance above about 230° F. and up to about 600° F., but preferably below temperatures at which substantial amounts of potassium sulfate form, e.g. 400° F., and preferably above about 300° F. under essentially anhydrous conditions, to release sulfur dioxide and convert the potassium pyrosulfite to potassium sulfite which is suitable for reuse. This decomposition method eliminates the need to vaporize large amounts of water to remove sulfur dioxide when anhydrous conditions are desired. The hot potassium sulfite produced upon decomposition of the crystals can be redissolved in water or the filtrate resulting from the separation of the potassium pyrosulfite and recycled to the reaction zone.

Parent application Ser. No. 594,431, now abandoned, describes the separation of the potassium pyrosulfite crystals from an aqueous solution and temperatures crystals wet with water to them to produce sulfur dioxide. The potassium pyrosulfite crystals can be advantageously heated in the presence of to decomposition to produce sulfur dioxide at relatively low temperatures. The water employed can be residual water of the mother liquor contained by the crystals or it can be added water; it can be in any suitable form, e.g. liquid or vapor form; and it is used in amounts sufficient to enhance the decomposition of the potassium pyrosulfite to produce sulfur dioxide. These amounts are at least about 0.01 weight percent, generally from about 1 to 99 weight percent and advantageously from about 20 to 75 weight percent based on the potassium pyrosulfite and water. In amounts up to about 20 weight percent water, damp crystals are provided and in amounts of about 40 weight percent, for instance, a solution can be provided. When in solution, however, the potassium pyrosulfite is in the bisulfite form.

The potassium pyrosulfite in the presence of, or in contact with, water is heated to temperatures sufficient to produce sulfur dioxide and temperatures generally from about 100° to 225° F. or 375° F., preferably from about 150° to 225° F. can be used under ambient pressure conditions.

The decomposition of the potassium pyrosulfite in contact with water can be conducted under ambient pressures or superatmospheric pressures, for instance from about 0 to 300 p.s.i.a., generally from about 15 to 150 p.s.i.a. although ambient pressures can be advantageously employed. In a modification of this aspect of the present invention, superatmospheric pressures can be employed when the potassium pyrosulfite is in aqueous solution to increase the concentration of the solution at higher temperatures, e.g. above about 230° F. and up to about 375° F., with a consequent increase in the partial pressure of sulfur dioxide in the potassium pyrosulfite and an enhancement of the production of sulfur dioxide. Generally the water employed in this aspect is from about 5 to 50 weight percent. For instance, if potassium bisulfite solutions are heated under a pressure of about 100 p.s.i.a. with a temperature of about 350° F., the solubility of the pyrosulfite crystal is much greater, e.g. about 75 weight percent based on the crystals and water. This higher concentration provides a much higher partial pressure of sulfur dioxide than at lower concentrations and the percent conversion of potassium pyrosulfite to potassium sulfite is greater.

Another advantageous feature of using water to enhance the decomposition of potassium pyrosulfite at a lower temperature is the obviation of use of an inert heating material which is desirable when heating pyrosulfite in an essentially dry state to decompose it to produce sulfur dioxide gas. Relatively high temperatures, e.g. up to 400° F., are generally used under these dry state conditions and the use of an inert heating material is generally desirable to maintain the potassium sulfite (which is also produced along with sulfur dioxide during decomposition of the pyrosulfite) in a liquid medium which occludes the potassium sulfite crystals and prevents contact with the sulfur dioxide. The partial pressure of the potassium sulfite, like that of the sulfur dioxide, is also high enough to vaporize it and contaminate the sulfur dioxide product at these high temperatures and they may react to produce undesirable potassium thiosulfite and potassium sulfate. When used, the chemically inert heating material is one that is normally liquid under the temperature conditions employed and among those suitable are organic materials such as Dowtherm (a mixture of diphenyl and diphenyl oxide having a boiling point of about 525° F.) and mineral oil. The inert material is used in amounts sufficient to form a slurry with the potassium pyrosulfite crystals and these amounts generally range from about 10 to 90 wt. percent of inert material based on the inert material and the potassium pyrosulfite.

The utilization of water to enhance decomposition of the potassium pyrosulfite is preferable to the anhydrous procedure since it obviates the desirability of using such inert materials and the expense of handling such materials and it provides for the production of sulfur dioxide at significantly lower temperatures and a higher conversion of potassium pyrosulfite (bisulfite) to sulfur dioxide.

Since there is generally a small amount of sulfur trioxide present in waste gases containing sulfur dioxide, a small amount of potassium sulfate is formed which is periodically removed. Additionally, oxygen present in the waste gases can react with the potassium sulfite to produce additional potassium sulfate so that it may be desirable to add an oxidation inhibitor, e.g. organics such as hydroquinone, etc., to the potassium sulfite solution. The potassium sulfate generally crystallizes with the pyrosulfite and can be separated by periodically redissolving the pyrosulfite crystals, which are more soluble in water than potassium sulfate. The redissolved pyrosulfite crystals can be recycled to the reaction zone after the solid potassium sulfate is removed. Potassium sulfate is desirable as a constituent of fertilizers. If desired, this process can be directed toward the production of potassium sulfate by omitting the inhibitor and increasing the amount of potassium sulfate produced.

The present invention will be more fully understood from the following detailed description thereof when read in conjunction with the accompanying drawings in which.

Figure 1:
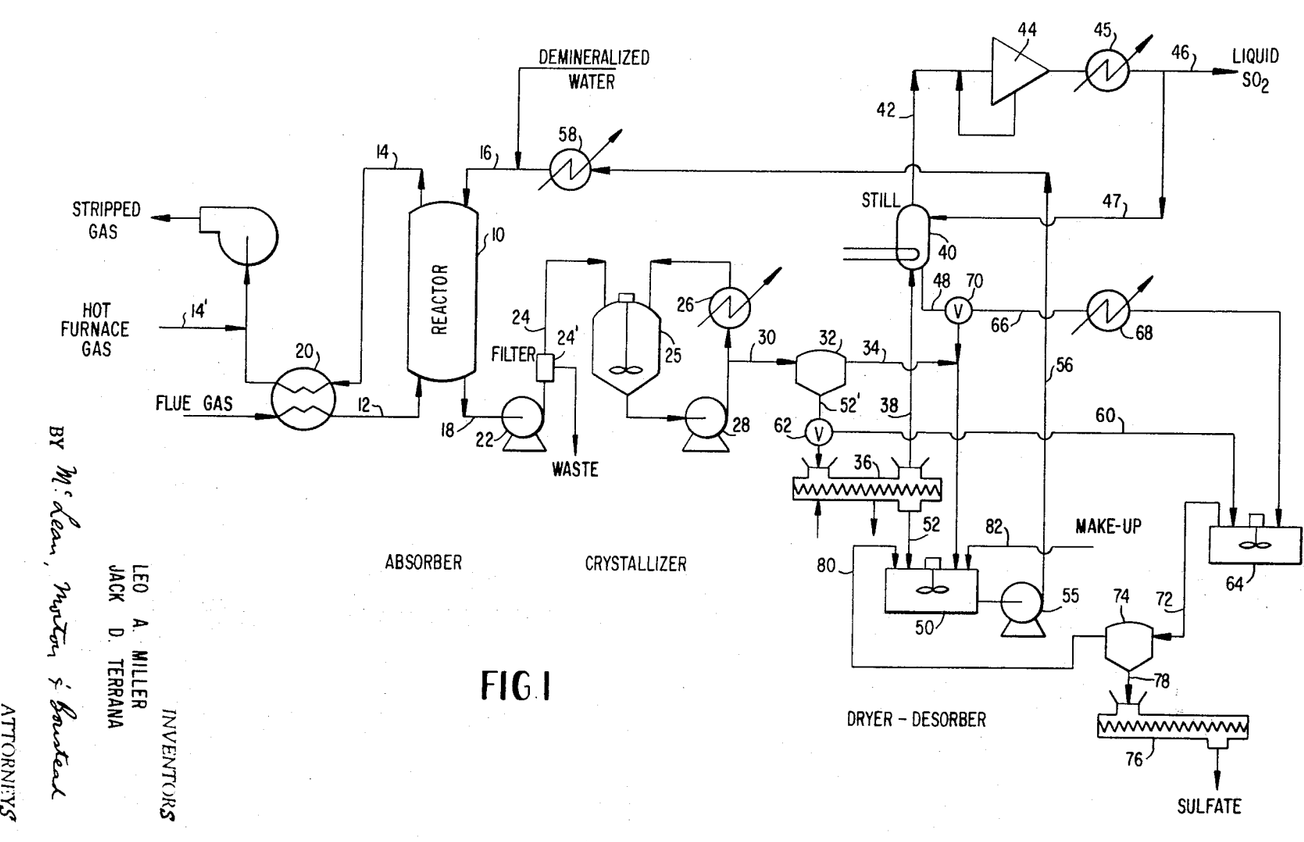
FIG. 1 is a flow sheet of the system for the recovery of $SO_2$ in accordance with this invention.

Referring now to FIG. 1, a gas steam containing sulfur dioxide, e.g. flue gases from a power plant, is introduced into reactor 10 through line 12. Sulfur dioxide in the flue gas is absorbed in reactor 10 and the stripped flue gases exit from reactor 10 through line 14. Sulfur dioxide is absorbed from the flue gas by absorption into and reaction with an aqueous solution of potassium sulfite to produce an aqueous potassium bisulfite solution. The potassium sulfite solution is introduced into reactor 10 through line 16, generally at a rate of from about 0.1 to 5 gallons, preferably from about 0.5 to 2 gallons for each 500 c.f.m. (cubic feet per minute) of flue gas, and the potassium bisulfite solution is removed through line 18. The stripped gases in line 14 and the incoming flue gases in line 12 are passed in a countercurrent heat exchange relationship through heat exchanger 20. The flue gas is generally at a temperature of about 300 to 360° F. as it is discharged from a power plant and it can be cooled to a temperature of from about 225° F. to 300° F. in heat exchanger 20. However, in reactor 10 it is further cooled by absorbing moisture.

Figure 2:
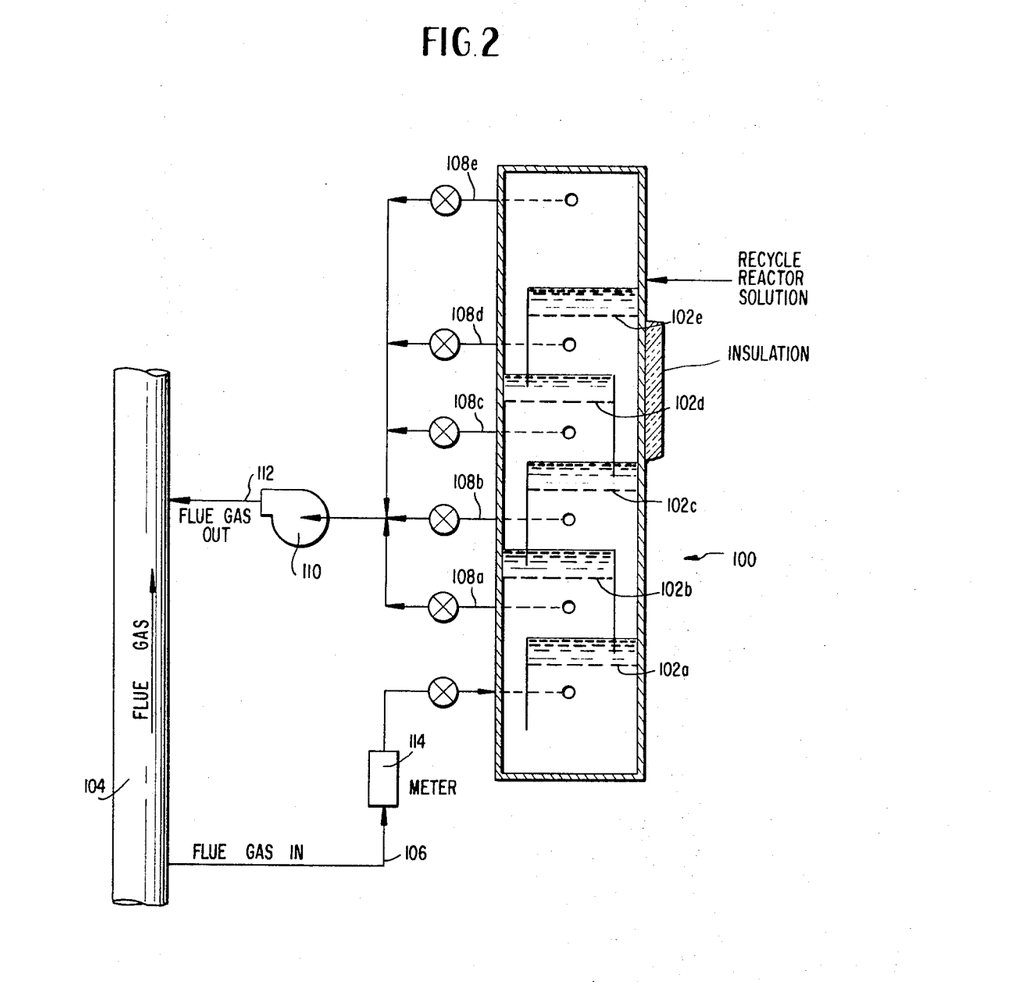
FIG. 2 illustrates in detail a suitable reactor for use with Reaction I.

Reactor 10, is for example, a column designed for intimate contact of countercurrently flowing gas and liquid streams such as a packed tower or a plate tower containing bubble trays or sieve plates 102 such as shown in FIG. 2. Tower 100 of FIG. 2 has five sieve plates 102a through e, although, of course, any desired number can be used. Flue gas is introduced at the bottom of tower 100 through line 106 from flue gas line 104 and passed upwardly through plates 102. The stripped flue gas is removed at the desired point in tower 100 via lines 108a, b, c, d, and/or e. Blower 110 reintroduces the stripped gas into line 104 through line 112. Line 104 can, for example, be a feed line for a stack. Meter 114 in line 106 can be used to regulate the introduction of flue gas through line 106, if desired, to insure substantially complete removal of sulfur dioxide.

The temperature of the solution in the reaction zone, i.e. reactor 10, is generally maintained sufficient to react sulfur dioxide and potassium sulfite and insufficient to decompose the potassium bisulfite produced therein or potassium pyrosulfite. Since the stripped flue gas is generally discharged into a stack, it is desirable to maintain the temperature of the gases at a temperature sufficiently high to maintain their buoyancy so that they will rise in the stack, e.g. about 185° F. At lower temperatures, e.g. 135° F., a fan can be used. The temperature of the stripped flue gas in line 14 can be increased, if desired, by the introduction of a hot furnace gas through line 14'.

Figure 3:
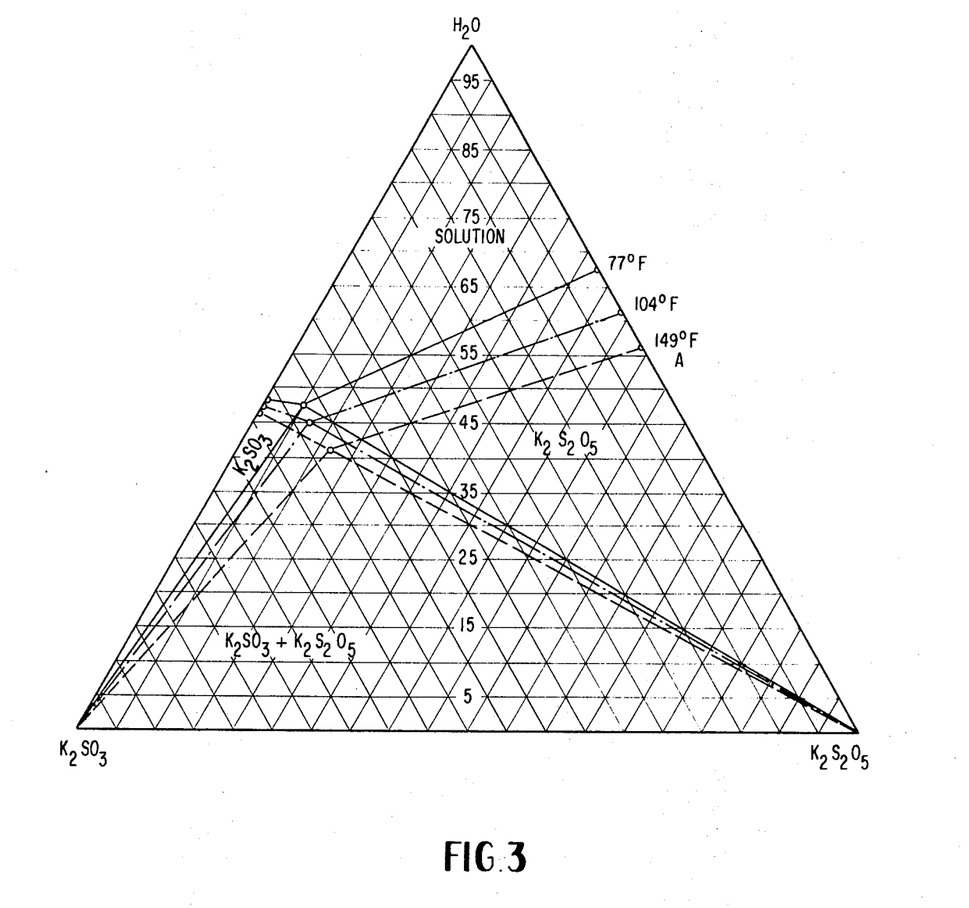
FIG. 3 is a three-component phase diagram for the system: $K_2SO_3$, $K_2S_2O_5$ and $H_2O$.

The product of the reaction zone is preferably a saturated solution of potassium bisulfite, and, accordingly, the concentration of the solution is desirably maintained at just below saturation by the addition of sufficient water to avoid precipitation of potassium bisulfite. As noted above, this would occur as the crystallization of potassium pyrosulfite The amount of solids in the solution will vary depending upon the temperature but it is generally maintained sufficiently high for efficient sulfur dioxide recovery. There will generally be between about 45 and 75 weight percent, preferably between about 50 and 65 weight percent solids in the solution. The amount of potassium bisulfite and potassium sulfite in the solids will vary depending upon the total percentage of solids and the temperature of the solution. FIG. 3 is a phase diagram of the three component systems: potassium sulfite, potassium pyrosulfite or bisulfite, and water. In general, about 5 to 50 or 60 weight percent, preferably 10 or 40 to 50 or 60 weight percent, is potassium bisulfite and generally 40 or 50 to 95 weight percent, usually about 50 or 65 to 90 weight percent is potassium sulfite. For example, as shown by FIG. 3, at 77° F. a saturated aqueous solution of potassium pyrosulfite and potassium sulfite will contain about 5 percent potassium pyrosulfite and 47 percent potassium sulfite; at about 104° F. this solution will contain about 7 percent pyrosulfite and 48 percent sulfite; and at about 149° F. the solution contains about 12 percent pyrosulfite and 48 percent sulfite.

The solution of potassium sulfite introduced into the reaction zone is preferably a recycle stream and, generally contains from about 30 or 40 to 75, preferably about 40 or 50 to 65 weight percent solids of which generally at least about 50 percent, desirably above about 75 percent, is potassium sulfite and the balance is essentially potassium bisulfite with, however, some sulfate. This recycle stream is preferably a saturated solution of potassium sulfite. The potassium sulfite solution can contain a sufficient amount of an oxidation inhibitor, for instance hydroquinone, e.g. about 0.001 to 0.1 percent to inhibit the oxidation of the sulfite ion. The temperature of this stream is controlled to avoid upsetting the requirements of reactor 10. The temperature of recycle stream is typically about 90° to 125° F. or 150° F. In general, a sufficient amount of potassium sulfite solution is contacted with the flue gas in reactor 10 to remove as much of the sulfur in as possible, desirably above about 90 or 95 percent, and the residence time of the solution in the reactor, the total amount of solution, the temperature of the reactor, etc., are adjusted accordingly.

The potassium bisulfite solution removed from reactor 10 passes through line 18 and is pumped by pump 22 through line 24 through filter 24' to crystallizer 25. This solution typically can contain about 3 weight percent potassium sulfate, about 24 weight percent potassium bisulfite, about 23 weight percent potassium sulfite and about 50 weight 24' water. Filter 24' removes any solid material, mostly fly ash from the solution. The solution is recycled through crystallizer 25 and cooler 26 by pump 28 and cooled, e.g. to below 110° F. to form a slurry containing potassium pyrosulfite crystals. A portion of this slurry is drawn off through line 30 and passed to centrifuge 32 wherein the crystals are separated. The resultant solution is passed from centrifuge 32 to hold up tank 50 through line 34. The separated potassium pyrosulfite crystals, which can be further purified by washing them with water or pure potassium bisulfite solution to remove occluded mother liquor containing potassium sulfite, are passed to dryer-desorber 36 where they are heated to a temperature for decomposition, e.g. 300° to 400° F., and the resultant sulfur dioxide, and any residual water vapor remaining with the crystals, is passed through line 38 to drying still 40. Still 40 separates the water vapor from the sulfur dioxide, sulfur dioxide being removed through line 42, compressor 44 and heat exchanger 45, to provide a liquid sulfur dioxide product stream in line 46. A portion of the liquid sulfur dioxide is recycled to still 40 through line 47. Water is removed recycled still 40 through line 48 and combined with the solution in line 34 for passage to tank 50. The hot potassium sulfite produced in dryer 36 is also passed to tank 50 through line 52 where it is combined with the solution from centrifuge 32 and condensate from still 40 to provide an aqueous potassium sulfite solution. This solution is passed through line 56 and heat exchanger 58 via pump 55 for introduction into reactor 10 through line 16. If desired, makeup water, potassium sulfite, etc. can be introduced into tank 50. Demineralized water can be introduced into line 16.

When it is desired to remove potassium sulfate from the separated crystals in line 52', the crystals can be diverted through line 60 by valve 62 to a dissolver 64. A portion of the condensate from still 40 can also be diverted to the dissolver 64 through line 66 and heat exchanger 68 by valve 70. The amount of condensate diverted through line 66 can be controlled to be just sufficient to dissolve the potassium pyrosulfite crystals in the dissolver 64 without dissolving the less soluble potassium sulfate. The potassium sulfate slurry, the liquid phase of which is dissolved potassium pyrosulfite, can be passed through line 72 to a centrifuge 74 where the potassium sulfate crystals can be separated. The resulting solution of potassium pyrosulfite can be recycled to hold up tank 50 through line 80. The potassium sulfate product in line 78 can be dried in a screw conveyor 76. Makeup potassium can be added to tank 50 through line 82.

EXAMPLES I AND IA

The following tables, table I and table II, set forth specific examples of this process, giving compositions of the streams for the various lines and prevailing temperatures.

produced in conveyor 36 is redissolved in water and introduced into reactor 10. When the solution in crystallizer 25 is cooled to 77° F., the $K_2S_2O_5$ content is reduced to about 5 percent.

EXAMPLE III

Figure 4:
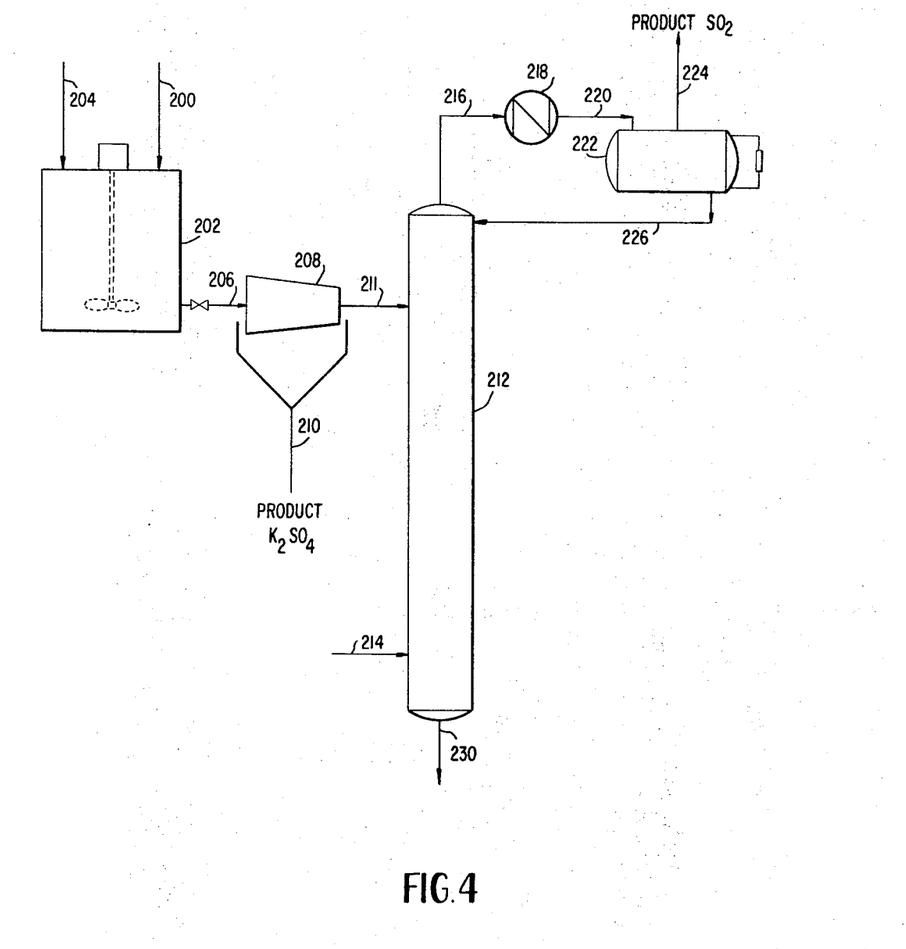
FIG. 4 is a flow sheet showing a modification of the flowsheet of FIG. 1.

With reference to FIG. 4, there is illustrated a procedure for processing potassium pyrosulfite crystals in the presence of water to enhance decomposition of potassium pyrosulfite and produce sulfur dioxide. In connection with this illustration, 262 lbs. per hour of solids from a centrifuge, for instance such as centrifuge 32 in FIG. 1, composed of 260 lbs. of potassium pyrosulfite crystals and 2 lbs. of potassium sulfate are conducted through line 200 into mixing vessel 202 where it is mixed with makeup water introduced into the vessel through line 204 at a flow of 230 lbs. per hour (0.46 gallons per minute), a temperature of 85° F. and a specific gravity of 1.0.

TABLE I

| | Flue gas to— | | Flue gas from absorption column 10 | Solution to absorption column (line 16) | Solution to crystallizer (line 18) | Slurry to centrifuge (line 30) | Solids to dryer 36 | Solution to dissolver (line 34) | Solids to dissolver (line 52) | Wet $SO_2$ (line 38) |
|---|---|---|---|---|---|---|---|---|---|---|
| | Exchanger 20 | Absorption column 10 | | | | | | | | |
| Flow, lbs./hr | 1,150,000 | 1,150,000 | 1,143,000 | 1,151,400 | 1,156,071 | 1,156,634 | 35,341 | 1,120,456 | 26,614 | 8,880 |
| Flow, g.p.m. | | | | 1,425 | 1,425 | 1,425 | | | | |
| Volume, c.f.h. | 14,000,000 | | | | | | | | | |
| Temperature, °F | 350 | 265 | 130 | 140 | 185 | 130 | 130 | 130 | 350 | |
| Specific gravity | | | | | | | | | 1.6 | 1.6 |
| $K_2SO_3$, lbs./hr | | | | 488,000 | 469,000 | 469,000 | 1,482 | 467,518 | 17,974 | |
| $K_2S_2O_5$, lbs./hr | | | | | | 23,734 | 23,172 | | 715 | |
| $KHSO_3$, lbs./hr | | | | 154,000 | 179,050 | 154,000 | 562 | 153,438 | | |
| $K_2SO_4$, lbs./hr | | | | 63,000 | 63,500 | 63,500 | 7,925 | 55,500 | 7,925 | |
| $H_2O$, lbs./hr | | | | 446,400 | 444,521 | 446,400 | 2,200 | 444,000 | 0 | 2,200 |
| $SO_2$, lbs./hr | 7,360 | 7,360 | 680 | | | | | | | 6,680 |

TABLE II

| | Flue gas to— | | Flue gas from absorption column 10 | Solution to absorption column (line 16) | Solution to Crystallizer (line 18) | Slurry to centrifuge (line 30) | Solids to dryer 36 | Solution to dissolver (line 34) | Solids to dissolver (line 52) | Wet $SO_2$ (line 38) |
|---|---|---|---|---|---|---|---|---|---|---|
| | Exchanger 20 | Absorption column 10 | | | | | | | | |
| Flow, lbs./hr | 1,150,000 | 1,150,000 | 1,143,000 | 1,209,901 | 1,217,080 | 1,217,080 | 91,371 | 1,125,709 | 77,620 | 13,751 |
| Flow, g.p.m. | | | | 1,425 | 1,425 | 1,425 | | | | |
| Volume, c.f.h. | 14,000,000 | | | | | | | | | |
| Temperature, °F | 350 | 265 | 130 | 140 | 135 | 110 | 110 | 110 | 350 | |
| Specific gravity | | | | | | | | | 1.6 | 1.6 |
| $K_2SO_3$, lbs./hr | | | | 273,207 | 256,715 | 256,715 | 3,408 | 253,307 | 19,900 | |
| $KHSO_3$, lbs./hr | | | | 315,168 | 340,218 | 256,715 | 3,408 | 253,307 | | |
| $K_2S_2O_5$, lbs./hr | | | | | | 77,240 | 77,240 | | 57,220 | |
| $K_2SO_4$ | | | | 35,240 | 35,740 | 35,740 | 500 | 35,240 | 500 | |
| $H_2O$, lbs./hr | 7,360 | 7,360 | 680 | 586,286 | 584,407 | 590,670 | 6,815 | 583,855 | | 7,071 |
| $SO_2$, lbs./hr | | | | | | | | | | 6,680 |

The flue gas used in examples I and IA has the typical compositions in mole percent; sulfur dioxide, 0.3 percent; oxygen, 3.4 percent; water vapor, 6.0 percent; carbon dioxide, 14.2 percent; nitrogen, 76.1 percent; and sulfur trioxide, trace. The amount of potassium sulfate recovered is about 400 pounds per hour.

EXAMPLE II

An aqueous solution containing about 48 weight percent $K_2SO_3$ is reacted with a flue gas having the typical composition as in example I. The solution has an average residence time in reactor 10 of about 8 to 12 seconds per tray advantageously, although it can range from about 1 to 600 seconds if desired, an inlet temperature of about 100° F. and an outlet temperature of about 180° F. About 95 percent of the sulfur dioxide is removed from the flue gas. The solution removed from reactor 10 is an aqueous solution containing about 10 weight percent $KHSO_3$ and 40 weight percent $K_2SO_3$. This solution is cooled in crystallizer 25 to about 104° F. which reduces the $KHSO_3$ content to about 7 weight percent, the remaining 3 weight percent precipitating as $K_2S_2O_5$. The residence time in the crystallizer is generally from about 1 to 30 minutes, preferably about 5 to 15 minutes and in this example it is 10 minutes. The precipitated $K_2S_2O_5$ is separated by centrifuge 32 and passed to the screw conveyor 36 which is maintained at about 350° F. Sulfur dioxide evolves and is collected. The $K_2SO_3$ also The resulting solution is conducted through line 206 to centrifuge 208 where potassium sulfate is removed at a rate of 2 lbs. per hour and is discharged through line 210. The aqueous solution of potassium bisulfite from centrifuge 208 composed of about 60 weight percent potassium bisulfite and about 40 weight percent water having a specific gravity of 1.5 is introduced into column 212, which can be a column of the type illustrated in FIG. 2, by way of line 211 at a flow rate of 473 lbs. per hour (0.63 gallons per minute). Line 214 is used to introduce steam at a rate of 135 lbs. per hour into column 212 to heat the aqueous solution of potassium bisulfite to a temperature of 225° F., the potassium bisulfite decomposes to produce sulfur dioxide and a resulting aqueous solution.

The sulfur dioxide in water vapor is conducted through line 216 to condenser 218, the water vapor is condensed and the condensate is conducted through line 220 to separation vessel 222 where the sulfur dioxide gas at a rate of 27 lbs. per hour is removed through line 224 for further processing. Water is removed through line 226 and can be returned to column 212 as shown.

The resulting solution from vessel 212 at a rate of 455 lbs. per hour (0.61 gallons per minute), having a temperature of 225° F. and specific gravity of 1.5 can be returned via line 230 to a crystallizer, for instance one such as crystallizer 32 in FIG. 3, for further use.

EXAMPLE IV

Essentially the same procedure used in example III is followed except an aqueous solution of potassium bisulfite composed of about 75 weight percent potassium bisulfite and about 25 weight percent water is heated in column 212 to a temperature of 350° F. at a pressure of 100 p.s.i.a. to produce sulfur dioxide.

EXAMPLE V

The procedure of example I is followed utilizing about 0.1 percent hydroquinone to reduce the production of potassium sulfate.

We claim:

1. A process of recovering sulfur dioxide from sulfur dioxide containing gases comprising contacting the gas with potassium sulfite in aqueous solution at a temperature below about 230° F. and sufficient to have $SO_2$ in the gas convert potassium sulfite to potassium bisulfite which is in contact with $SO_2$ partial pressure-lowering potassium sulfite in the solution; separating potassium bisulfite from potassium sulfite, to obtain bisulfite in the pyrosulfite form, to increase the purity of the potassium bisulfite as pyrosulfite and result in an increase of the partial pressure of the sulfur dioxide combined in such material; heating said purified material having greater than about 65 weight percent potassium pyrosulfite on a dry basis, at temperatures sufficient to produce sulfur dioxide; and recovering sulfur dioxide.

2. A process for recovering sulfur dioxide from a sulfur dioxide containing gas containing 0.001 to 5 mole percent sulfur dioxide comprising contacting the gas with potassium sulfite in aqueous solution at a temperature below about 230° F. and sufficient to have $SO_2$ in the gas convert potassium sulfite to potassium bisulfite which is in contact with $SO_2$ partial pressure-lowering potassium sulfite in the solution; crystallizing potassium bisulfite out of the solution as potassium pyrosulfite, to increase the purity of the potassium bisulfite as pyrosulfite by separating it from amounts of potassium sulfite sufficient to result in an increase of the partial pressure of the sulfur dioxide combined in such material, said pyrosulfite of increased purity having greater than about 65 weight percent pyrosulfite on a dry basis; and heating the purified material at a temperature sufficient to produce sulfur dioxide; and recovering sulfur dioxide.

3. The process of claim 2 wherein the purified potassium bisulfite is in the form of potassium pyrosulfite having a purity of greater than about 90 weight percent on a dry basis and the purified material is heated at a temperature greater than 100° F. and below temperatures at which substantial amounts of potassium sulfate are formed in the presence of water in amounts sufficient to enhance the decomposition of the purified material to produce sulfur dioxide.

4. The process of claim 3 wherein the purified material is heated in the presence of about 0.01 to 99 weight percent water based on the potassium pyrosulfite and water, at a temperature from about 100° F. to 375° F., and a pressure from about 0 to 300 p.s.i.a.

5. The process of claim 3 wherein the purified material is heated in the presence of about 20 to 75 weight percent water under ambient pressure conditions.

6. The process of claim 3 wherein the purified material is heated in the presence of about 5 to 50 weight percent water at a temperature from about 230° F. to 375° F. and a pressure from about 15 to 150 p.s.i.a.

7. The process of claim 2 wherein the purified pyrosulfite is heated under essentially anhydrous conditions.

8. The process of claim 7 wherein the potassium sulfite solution contains from about 30 to 75 weight percent of total potassium sulfite and bisulfite of which at least about 50 percent is potassium sulfite; the potassium pyrosulfite is provided at a purity greater than about 90 weight percent and purified material is heated at a temperature from about 230° F. to 400° F. under ambient pressure conditions in the presence of sufficient amounts of a chemically inert heating liquid to occlude potassium sulfite produced during the heating and limit contact of the potassium sulfite with the desired sulfur dioxide.

9. The process of claim 8 wherein the liquid is mineral oil and is used in amounts from about 10 to 90 weight percent, based on the inert material and the potassium pyrosulfite.

10. A process for the recovery of sulfur dioxide from a gas containing the same, comprising reacting said gas containing sulfur dioxide in a reaction zone with potassium sulfite in aqueous solution to convert potassium sulfite in solution to potassium bisulfite, the reaction zone being maintained at a temperature below about 230° F. and sufficient to react the sulfur dioxide with the potassium sulfite and react temperature at which potassium bisulfite decomposes to potassium sulfite, cooling the solution containing potassium bisulfite to a temperature at which at least a portion of the potassium bisulfite therein crystallizes as potassium pyrosulfite, separating from the mother liquor potassium pyrosulfite crystals having a purity greater than about 65 weight percent on a dry basis, heating said purified material to a temperature sufficient to decompose said material and produce potassium sulfite and sulfur dioxide, and recovering the resulting sulfur dioxide.

11. The process of claim 10 including recycling to the reaction zone (a) potassium sulfite produced upon decomposition of said purified material and (b) solution of potassium bisulfite remaining after separation of potassium pyrosulfite.

12. The process of claim 10 wherein the aqueous solution containing potassium sulfite introduced into the reaction zone contains about 30 to 75 weight percent of total potassium sulfite and bisulfite; the reaction zone temperature is below about 230° F.; the bisulfite solution is cooled to below about 150° F. and said purified material is heated to between about 100° and 600° F.

13. The process of claim 12 wherein said reaction zone temperature is below about 190° F. and said purified material is heated to between about 300° F. and 400° F.

14. The process of claim 12 wherein at least about 50 percent of the total potassium sulfite and bisulfite in the aqueous solution introduced into the reaction zone is potassium sulfite, the solution contains an oxidation inhibitor to inhibit the reaction of sulfite ion and oxygen; and the aqueous solution of potassium bisulfite produced in said reaction zone contains about 45 to 75 weight percent of total potassium sulfite and bisulfite of which about 40 to 60 weight percent is potassium bisulfite and the balance essentially potassium sulfite.

15. The process of claim 14 wherein the potassium sulfite produced upon decomposition of said purified material is recycled to the reaction zone as an aqueous solution.

16. The process of claim 14 wherein the aqueous solution of potassium sulfite introduced to the reaction zone contains hydroquinone as the oxidation inhibitor and the aqueous solution containing potassium bisulfite produced in the reaction zone contains about 45 to 65 weight percent of total potassium bisulfite and sulfite.

17. The process of claim 10 wherein the sulfur dioxide containing gas is flue gas containing oxygen which reacts to produce potassium sulfate in the reaction zone, which sulfate crystallizes with the potassium pyrosulfite, and said potassium sulfate is recovered by periodically dissolving in water crystals of said separated pyrosulfite containing potassium sulfate, the amount of water being sufficient to dissolve the potassium pyrosulfite and insufficient to dissolve the potassium sulfate, separating the solid potassium sulfite and recycling resulting solution to the reaction zone.

UNITED STATES PATENT OFFICE
CERTIFICATE OF CORRECTION

Patent No. 3,615,198​​​​​​​​​​​​​​​​​​​​​​​​​​​​​​​​​​​​​​​​​​​​Dated October 26, 1971

Inventor(s) Jack D. Terrana and Leo A. Miller

It is certified that error appears in the above-identified patent and that said Letters Patent are hereby corrected as shown below:

Column 5, Line 32 "300" should read --300°--

Column 5, Line 69 "pyrosulfite The" should read --pyrosulfite. The--

Column 6, Line 41 "50 weight 24' water" should read --50 weight percent water--

Column 6, Line 49 "hold up" should read --hold-up--

Column 6, Line 62 "removed recycled still" should read --removed from still--

Column 6, Line 70 "makeup" should read --make-up--

Column 7, Line 12 "makeup" should read --make-up--

Column 7, Line 51 "0.3 percent oxygen" should read --0.3 percent; oxygen--

Column 7, Line 70 "$K_2S_2O_s$" should read --$K_2S_2O_5$--

Column 8, Line 17 "makeup" should read --make-up--

Column 9, Lines 16 and 17, "dioxide containing" should read --dioxide-containing--

Column 10, Line 6 "chemically inert" should read --chemically-inert--

Column 10, Line 18 "react" should read --below the--

Signed and sealed this 2nd day of May 1972.

(SEAL)
Attest:

EDWARD M. FLETCHER, JR.​​​​​​​​​​​​​​​​​​​​​​​​​​​ROBERT GOTTSCHALK
Attesting Officer​​​​​​​​​​​​​​​​​​​​​​​​​​​​​​​​​​​​​​​​​​​Commissioner of Patents